US006762739B2

(12) United States Patent
Bone

(10) Patent No.: US 6,762,739 B2
(45) Date of Patent: Jul. 13, 2004

(54) SYSTEM AND METHOD FOR REDUCING THE INTENSITY OUTPUT RISE TIME IN A LIQUID CRYSTAL DISPLAY

(75) Inventor: Matthew F. Bone, Fremont, CA (US)

(73) Assignee: Aurora Systems, Inc., San Jose, CA (US)

( * ) Notice: Subject to any disclaimer, the term of this patent is extended or adjusted under 35 U.S.C. 154(b) by 240 days.

(21) Appl. No.: 10/077,483

(22) Filed: Feb. 14, 2002

(65) Prior Publication Data

US 2003/0151599 A1 Aug. 14, 2003

(51) Int. Cl.[7] .................................................. H04N 5/208

(52) U.S. Cl. ............................. 345/90; 345/55; 345/63; 345/76; 345/77; 345/84; 345/87; 345/204; 345/205; 345/690

(58) Field of Search .............................. 345/90, 55, 63, 345/76, 77, 84, 87, 204, 205, 690

(56) References Cited

U.S. PATENT DOCUMENTS 3,852,620 A * 12/1974 Milberger et al. .......... 327/180
5,251,018 A * 10/1993 Jang et al. .................. 348/253

* cited by examiner

*Primary Examiner*—Bipin Shalwala
*Assistant Examiner*—Vincent E. Kovalick
(74) *Attorney, Agent, or Firm*—Henneman & Saunders; Larry E. Henneman, Jr.

(57) ABSTRACT

A system and method for reducing the intensity output response time of a liquid crystal display is disclosed. A display driver circuit selectively substitutes compensation data words for data words in a data stream, in order to reduce the intensity output rise time of a liquid crystal display. In one embodiment, the display driver circuit includes a buffer and a rise time compensator. The buffer receives and stores a first data word intended to be written to a particular pixel. The rise time compensator, upon receipt of a second data word intended for the same pixel, retrieves the first data word from the buffer, compares the value of the second data word to the value of the first data word, and selectively outputs either the second data word or a compensation data word, depending on the relative values of the first and second data words. If the value of the second data word exceeds the value of the first data word by some predetermined amount, then the compensation data word, having a value greater than the second data word, is substituted for the second data word.

33 Claims, 7 Drawing Sheets

700

| Gray Scale Data Value | 75 | 100 | 128 | 171 | 201 | 221 |
|---|---|---|---|---|---|---|
| Compensation Data Value | 189 | 206 | 227 | 242 | 249 | 253 |

SYSTEM AND METHOD FOR REDUCING THE INTENSITY OUTPUT RISE TIME IN A LIQUID CRYSTAL DISPLAY

BACKGROUND OF THE INVENTION

1. Field of the Invention

This invention relates generally to electronic display drivers, and more particularly to a driver for a liquid crystal display capable of achieving a more rapid display response by reducing the intensity output rise time.

2. Description of the Background Art

FIG. 1 shows a single pixel cell 100 of a typical liquid crystal display. Pixel cell 100 includes a liquid crystal layer 102, contained between a transparent common electrode 104 and pixel storage electrode 106, a storage element 108, and a switching transistor 110. Storage element 108 is coupled at node 112 to pixel storage electrode 106 and, via switching transistor 110, to a data input line 114. Storage element 108 is also coupled, as is common electrode 104 to a common voltage supply terminal 116 (e.g., ground). Responsive to a select signal on select line 118, which is coupled to the control terminal of switching transistor 110, storage element 108 reads a data signal in from data line 114, stores the signal, and asserts the signal on node 112, even after the select signal is no longer present.

Liquid crystal layer 102 rotates the polarization of light passing through it, the degree of rotation depending on the root-mean-square (RMS) voltage across liquid crystal layer 102. The ability to rotate the polarization is exploited to modulate the intensity of reflected light as follows. An incident light beam 120 is polarized by polarizer 122. The polarized beam then passes through liquid crystal layer 102, is reflected off of pixel electrode 106, and passes again through liquid crystal layer 102. During this double pass through liquid crystal layer 102, the beam's polarization is rotated by an amount which depends on the data signal being asserted on pixel storage electrode 106. The beam then passes through polarizer 124, which passes only that portion of the beam having a specified polarity. Thus, the intensity of the reflected beam passing through polarizer 124 depends on the amount of polarization rotation induced in liquid crystal layer 102, which in turn depends on the data signal being asserted on pixel storage electrode 106.

Storage element 108 can be either an analog storage element (e.g. capacitative) or a digital storage element (e.g., SRAM latch). In the case of a digital storage element, a common way to drive pixel storage electrode 106 is via pulse-width-modulation (PWM). In PWM, different gray scale levels are represented by multi-bit words (i.e., binary numbers). The multi-bit words are converted to a series of pulses, whose time-averaged root-mean-square (RMS) voltage corresponds to the analog voltage necessary to attain the desired gray scale value.

For example, in a 4-bit PWM scheme, the frame time (time in which a gray scale value is written to every pixel) is divided into 15 time intervals. During each interval, a signal (high, e.g., 5V or low, e.g., 0V) is asserted on the pixel storage electrode 106. There are, therefore, 16 (0–15) different gray scale values possible, depending on the number of "high" pulses asserted during the frame time. The assertion of 0 high pulses corresponds to a gray scale value of 0 (RMS 0V), whereas the assertion of 15 high pulses corresponds to a gray scale value of 16 (RMS 5V). Intermediate numbers of high pulses correspond to intermediate gray scale levels.

A particular signal being applied during a time interval is referred to as a "state". For example, a high signal being asserted during one time interval is an "on" state. Similarly, a low signal being asserted during one time interval is referred to as an "off" state.

FIG. 2 shows a series of pulses corresponding to the 4-bit gray scale value (1010), where the most significant bit is the far left bit. The pulses are grouped to correspond to the bits of the binary gray scale value. Specifically, the first group B3 includes 8 intervals ($2^3$), and corresponds to the most significant bit of the value (1010). Similarly, group B2 includes 4 intervals ($2^2$) corresponding to the next most significant bit, group B1 includes 2 intervals ($2^1$) corresponding to the next most significant bit, and group B0 includes 1 interval ($2^0$) corresponding to the least significant bit. This grouping reduces the number of pulses required from 15 to 4, one for each bit of the binary gray scale value, with the width of each pulse corresponding to the significance of its associated bit. Thus, for the value (1010), the first pulse B3 (8 intervals wide) is high, the second pulse B2 (4 intervals wide) is low), the third pulse B1 (2 intervals wide) is high, and the last pulse B0 (1 interval wide) is low. This series of pulses results in an RMS voltage that is approximately $\sqrt{2/3}$ (10 of 15 intervals) of the full value (5V), or approximately 4.1V.

The resolution of the gray scale can be improved by adding additional bits to the binary gray scale value. For example, if 8 bits are used, the frame time is divided into 255 intervals, providing 256 possible gray scale values. In general, for (n) bits, the frame time is divided into ($2^n-1$) intervals, yielding ($2^n$) possible gray scale values.

Because the liquid crystal cells are susceptible to deterioration due to ionic migration resulting from a DC voltage being applied across them, the above described PWM scheme is modified to debias the cell. According to one method for debiasing the cells, the frame time is divided in half. During the first half, the PWM data is asserted on the pixel storage electrode, while the common electrode is held low. During the second half of the frame time, the complement of the PWM data is asserted on the pixel storage electrode, while the common electrode is held high. This results in a net DC component of 0V, avoiding deterioration of the liquid crystal cell, without changing the RMS voltage across the cell, as is well known to those skilled in the art.

FIG. 3 shows a response curve of an electrically controlled, birefringent liquid crystal cell. The vertical axis 302 indicates the percent of full brightness (i.e., maximum light reflection) of the cell, and the horizontal axis 304 indicates the RMS voltage across the cell. As shown, the minimum brightness (a dark pixel) is achieved at an RMS voltage Vtt. For some wavelengths of light, an RMS voltage less than Vtt results in a pixel that is not completely dark, as shown in FIG. 3. For other wavelengths, all RMS voltages less than Vtt result in a dark pixel. In the portion of the curve between Vtt and Vsat, the percent brightness increases as the RMS voltage increases, until 100% full brightness is reached at Vsat. Once the RMS voltage exceeds Vsat, however, the percent brightness decreases as the RMS voltage increases.

FIG. 4 shows the response curve of a typical liquid crystal display as successive frames of a particular gray scale value are written to the cell. Each period of the wave form corresponds to the forward and reverse bias assertion of a single frame of data. Note that there is a delay from time t0, when the data is first asserted on the cell, until time t1, when the intensity output of the cell actually corresponds to the steady state RMS voltage of the grayscale value being asserted. The delay is referred to as the "rise time" of the cell, and results from the physical properties of the liquid crystals.

The cell rise time can cause undesirable visual artifacts on a display. The artifacts are most noticeable when the display is displaying an image of a light object moving across a dark background, or vice versa. In mild cases, the leading edge of the moving object may appear blurred, or the moving object may leave a ghost trail. In the case of small or rapidly moving objects, the object may disappear altogether. What is needed is a system and method for reducing the cell rise time in liquid crystal displays, thus reducing the visual artifacts resulting therefrom.

SUMMARY

A novel display driver circuit is described. The display driver overcomes the problems associated with the prior art by selectively substituting compensation data words for data words in a data stream, in order to reduce the intensity output rise time in a liquid crystal display. In one embodiment, a display driver circuit includes a buffer and a rise time compensator. The buffer receives and stores a first data word intended to be written to a particular pixel. The rise time compensator, upon receipt of a second data word intended for the same pixel, receives the first data word from the buffer, compares the value of the second data word to the value of the first data word, and selectively outputs either the second data word or a compensation data word, depending on the relative values of the first and second data words. If the value of the second data word exceeds the value of the first data word by some predetermined amount, then the compensation data word, having a value greater than the second data word, is substituted for the second data word. The value of the compensation data word is reselected to minimize the response time for the pixel to transition from the output intensity associated with first data word to the output intensity associated with the second data word.

Various embodiments of rise time compensatory are disclosed. In one embodiment, incoming data words and the output of a compensation data word generator are multiplexed to the output of the rise time compensator. The compensation data word generator retrieves compensation data words from a look-up table (LUT) depending on the value of the incoming data words. The multiplexer is controlled by the output of a comparator circuit which compares the values of the incoming data words, and the data words from a previous frame of data corresponding to the same pixel. If the difference in values exceeds a predetermined amount, then the comparator asserts a control signal on the control input terminal of the multiplexer that causes the multiplexer to couple the output of the compensation data word generator to the output of the rise time compensator. If the difference in values does not exceed the predetermined amount, then the comparator asserts a second control signal on the control terminal of the multiplexer that causes the multiplexer to pass the incoming data words directly to the output terminals of the rise time compensator.

In another embodiment, the comparator generates a multi-bit difference (DIF) signal that depends on the difference in the values of the incoming data words and the previously asserted data words. The compensation data generator then outputs a compensation data word that depends on the incoming data word and the multi-bit DIF signal. This embodiment facilitates the provision of a plurality of compensation data words for a particular incoming data word, depending on the magnitude of the difference in the values of the incoming data word and the previously asserted data word.

A novel method for reducing the output intensity rise time in a liquid crystal display is also described. The method includes the steps of receiving a first data word having a value corresponding to a first voltage to be asserted on a pixel of a display, receiving a second data word having a value corresponding to a second voltage to be asserted on the same pixel, comparing the first data word to the second data word, and providing a compensation data word having a value corresponding to a voltage greater than the second voltage if the second voltage exceeds the first voltage by a predetermined amount.

DETAILED DESCRIPTION

The present invention overcomes the problems associated with the prior art, by providing a compensation data word to a pixel of a display, when the grayscale value (or the associated RMS voltage) of a data word intended for the pixel cell exceeds the grayscale value of the previously asserted data word by a predetermined amount. Specifically, the present invention describes a system and method for reducing the rise-time in a liquid crystal display. In the following description, numerous specific details are set forth (e.g., particular compensation data word values) in order to provide a thorough understanding of the invention. Those skilled in the art will recognize, however, that the invention may be practiced apart from these specific details. In other instances, details of well known display circuits and driving methods have been omitted, so as not to unnecessarily obscure the present invention.

Figure 5:
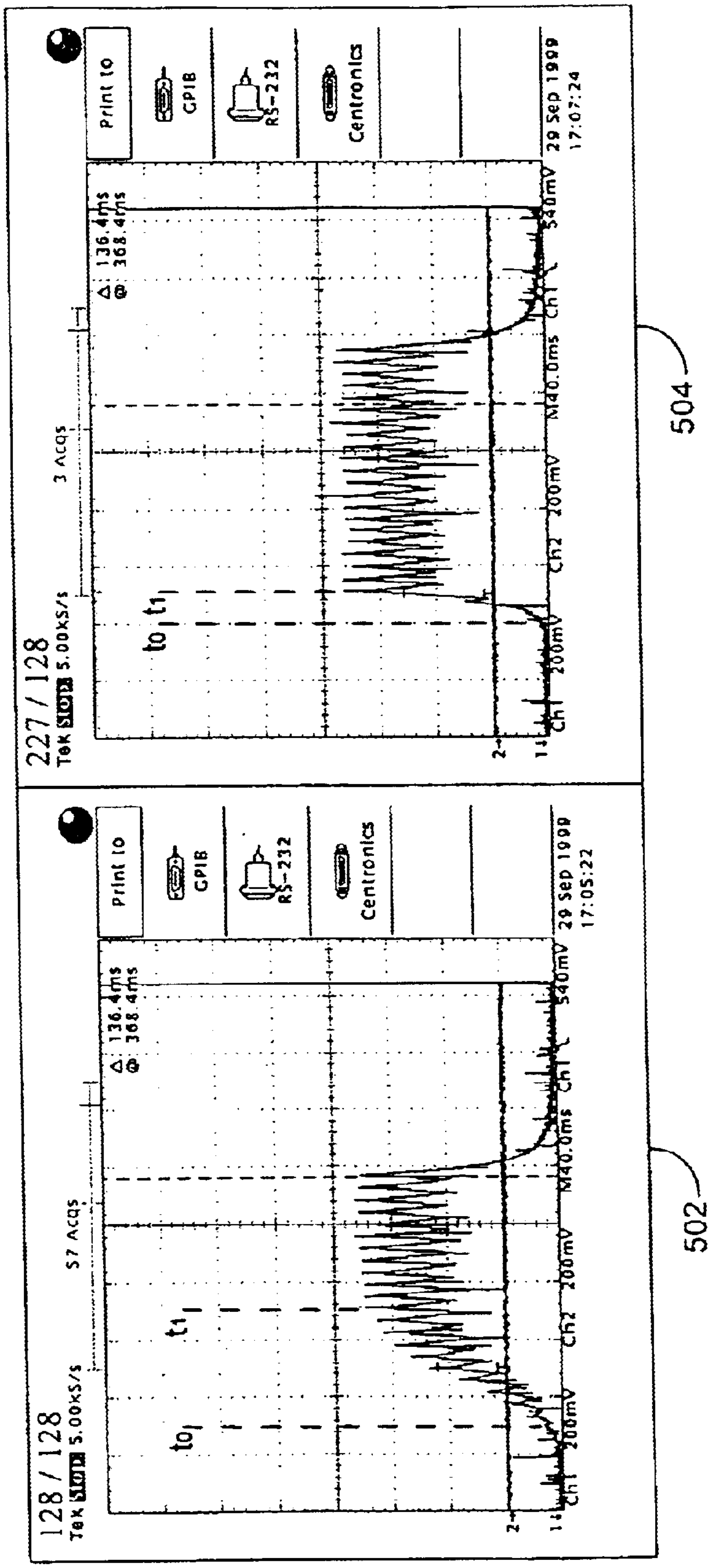
FIG. 5 shows response curves for a liquid crystal cell with and without rise time compensation according to the present invention.

FIG. 5 shows a comparison of two response curves 502 and 504, for a single liquid crystal cell. Each response curve 502 and 504 shows a pixel cell transition from 0 volts to a grayscale value of 128. The horizontal axes represent time, and the vertical axes represent pixel output intensity. Every five units along the horizontal axes correspond to 40 msec. Each of the sharp peaks in the curve correspond to writing an entire data word (e.g., 8 bits) to the pixel cell, and both curves 502 and 504 show the assertion of the same number of data words. In particular, 11 data words are each asserted twice, for a total of 22 data words being asserted on the pixel.

In response curve 502 the pixel cell is transitioned directly from zero volts to a gray scale value of 128. In other words, all 11 data words following the transition have a gray scale value of 128. As response curve 502 shows, it takes about 10–11 assertions of the data word for the pixel output to reach the steady state value. The first assertion of grayscale value 128 occurs at time t0, but the pixel cell does not reach the steady state output corresponding to the 128 grayscale value until about time t1. The delay between time t0 and time t1 in curve 502 is approximately 80 ms.

Response curve 504 shows the effect of replacing the first data word (grayscale value 128) with a compensation data word (grayscale value 227). Note that it takes only 2 assertions of the compensation data word for the pixel cell to reach the steady state output corresponding to the grayscale value of 128. The first assertion of the compensation data word (grayscale value 227) begins at about time t0, and the pixel cell reaches the steady state value output corresponding to the 128 grayscale value at about time t1. The delay between time t0 and time t1 in curve 504 is only about 20 ms. Thus, the use of the compensation data word increases the speed of the pixel response by a factor of four.

Figures 6, 7:
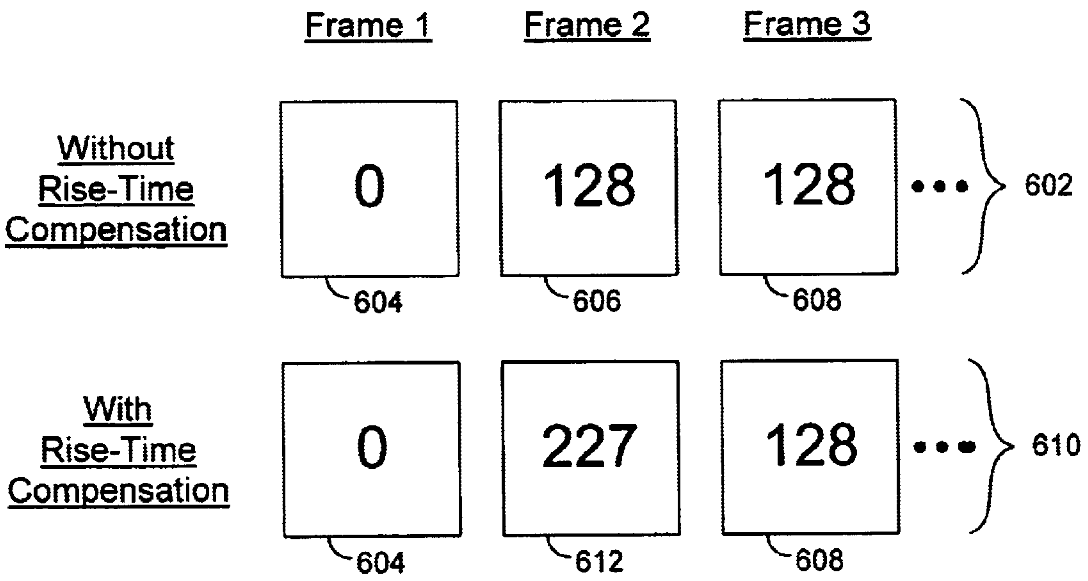
FIG. 6 is a representational diagram showing gray-scale values written to a particular pixel according to the present invention.
FIG. 7 is a table of grayscale data values and corresponding compensation data values.

FIG. 6 is a representational diagram showing two scenarios for asserting a series of data words making a transition from a grayscale value of 0 to a grayscale value of 128 on a pixel cell. In the first scenario 602, the transition is made without rise-time compensation. A first data word 604 in the series has a gray scale value of 0, and is asserted on the pixel during Frame 1. The next data word 606 has a grayscale value of 128, and is asserted on the pixel during Frame 2. A third data word 608 and subsequent data words (not shown) are asserted on the pixel cell during the third and subsequent frames. Making the transition from grayscale value 0 to grayscale value 128 in this manner will generate a response curve like curve 502 of FIG. 5.

According to the second scenario 610, the transition from grayscale value 0 to grayscale value 128 is made with rise-time compensation according to the present invention. First data word 604 is asserted on the pixel during Frame 1, just as in first scenario 602. However, during Frame 2, a compensation data word 612 having a grayscale value of 227 is asserted on the pixel cell instead of data word 606. Third data word 608 and subsequent data words (not shown) are then asserted on the pixel cell during the third and subsequent frames in scenario 610, the same as in scenario 602. The substitution of a data word 612 for data word 606 in scenario 610 results in a response curve like curve 504 of FIG. 5, with the above-described four-fold increase in response speed.

FIG. 7 is a table showing example compensation data word values appropriate for making transitions from a grayscale value of 0 to the particular grayscale values shown in table 700. For example, when making a transition from a grayscale value of 0 to a grayscale value of 75, a compensation data word having a grayscale value of 189 should be substituted for the first 75 value data word. Similarly, when making a transition from a grayscale value of 0 to a grayscale value of 100, a compensation data word having a grayscale value of 206 should be substituted for the first 100 value data word. When making a transition from a grayscale value of 0 to a grayscale value of 128, a compensation data word having a grayscale value of 227 should be substituted for the first 128 value data word, as shown in the example of FIG. 6. When making a transition from a grayscale value of 0 to a grayscale value of 171, a compensation data word having a grayscale value of 242 should be substituted for the first 171 value data word. When making a transition from a grayscale value of 0 to a grayscale value of 201, a compensation data word having a grayscale value of 249 should be substituted for the first 201 value data word. The final example in table 700 indicates that when making a transition from a grayscale value of 0 to a grayscale value of 221, a compensation data word having a grayscale value of 253 should be substituted for the first 221 value data word.

The compensation data word values provided in table 700 were determined empirically by computer simulation. Those skilled in the art will understand, however, that the present invention is not limited to any particularly valued compensation data words. In fact, the appropriate values for compensation data words used in any particular application may depend on a whole host of factors including, but not limited to, the magnitude of grayscale transition, the initial grayscale level of a pixel cell, the color of the light being modulated by the display, how many times each frame of data is written to the display, etc. For example, in the example of FIG. 5 and FIG. 6, each data word is written to the pixel twice. If, however, each data word is written to the pixel only once, then the grayscale value of the compensation data word could be increased such that the steady state value of the pixel output can be reached with a single assertion of the compensation data word on the pixel cell.

Figure 8:
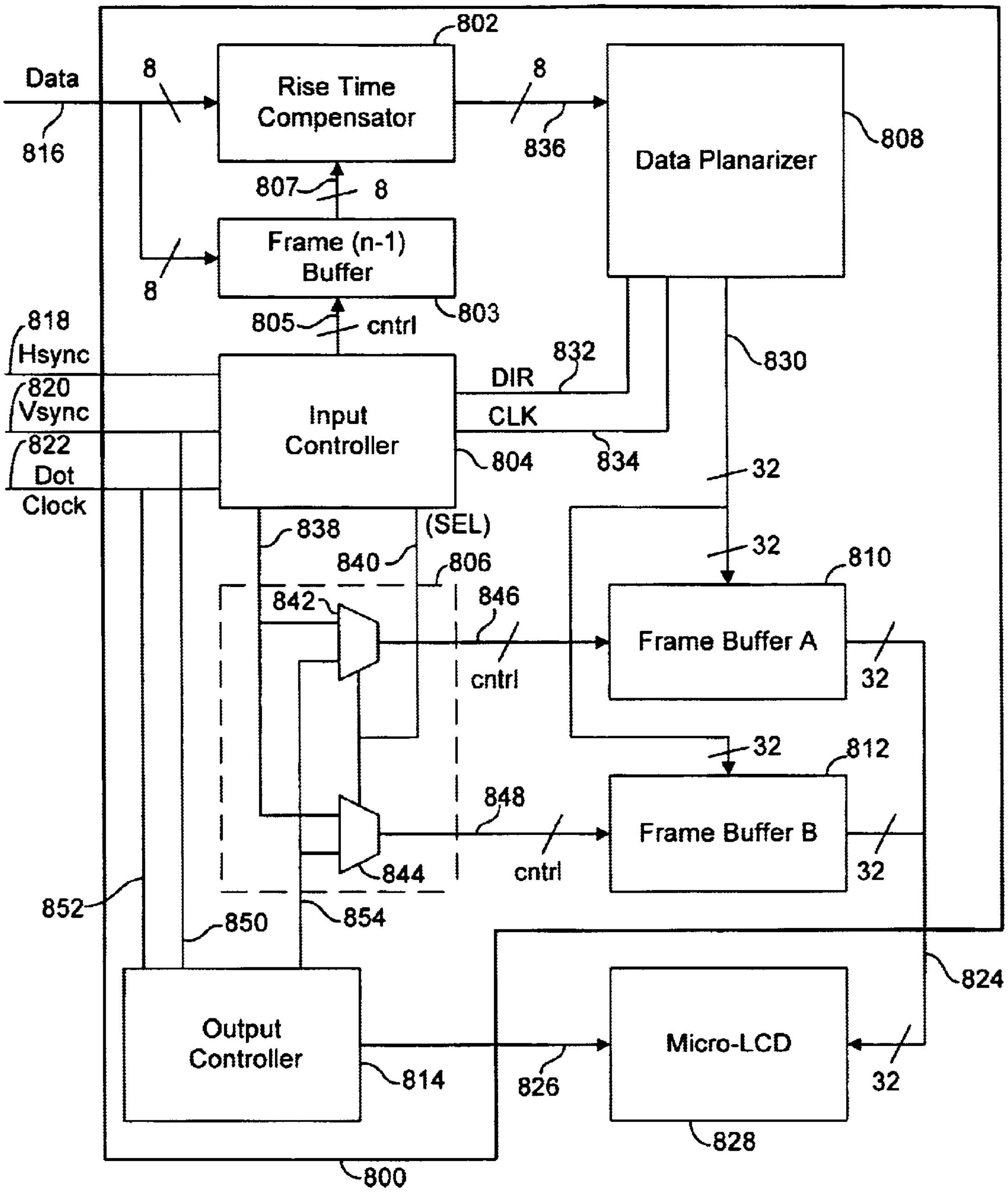
FIG. 8 is a block diagram of a display driver circuit for providing rise-time compensation in accordance with the present invention.

FIG. 8 is a block diagram of one particular display driver circuit 800 capable of providing rise-time compensated data to a display device 928 according to the present invention. Display driver circuit 800 includes a rise time compensator 802, a frame (n−1) buffer 803, an input controller 804, a control selector 806, a data planarizer 808, a frame buffer A 810, a frame buffer B 812, and an output controller 814. Display driver circuit 800 receives 8-bit, binary-weighted data words, via data input bus 816, and receives horizontal synchronization (Hsync), vertical synchronization (Vsync), and pixel dot clock signals via input terminals 818, 820, and 822, respectively.

Data words clocked into display driver circuit 800 pass through rise time compensator 802 before being planarized by data planarizer 808. Frame (n−1) buffer 803 stores each frame of data clocked into driver circuit 800, so that rise time compensator 802 can compare the value of each data word received to the value of the data word for the same pixel from the previous frame of data. Depending on the result of the comparison, rise time compensator either passes the received data word to planarizer 808, or provides a compensation data word to planarizer 808 instead. For example, if the gray scale value of a particular data word is close to the value of the data word from the previous frame, then no rise time compensation is necessary, and rise time compensator 802 simply passes the data word to planarizer 808. However, if the grayscale value of the data word is significantly greater than the value of the data word from the previous frame, then a compensation data word is transferred to data planarizer 808 to decrease the pixel cell rise time for the intensity transition from the value of the previous frame to the value of the current frame.

Data planarizer 808 receives data words, via 8-bit compensated data bus 836, each 8-bits (Pr[0–7]) corresponding to a gray scale value to be written to a particular pixel (r) of micro-LCD 828. Data planarizer 808 accumulates the 8-bit gray scale data for 32 pixels and reformats the data into 32-bit data words, each 32-bit word containing one bit from each of the group of 32 8-bit data words. For example, the 32-bit word formed by bits P0[0]–P31[0] includes the least significant bits of the data words for pixels 0–31. This reformatting is necessary because each bit of gray scale data is written to micro-LCD 828 32 pixels at a time.

Figure 1:
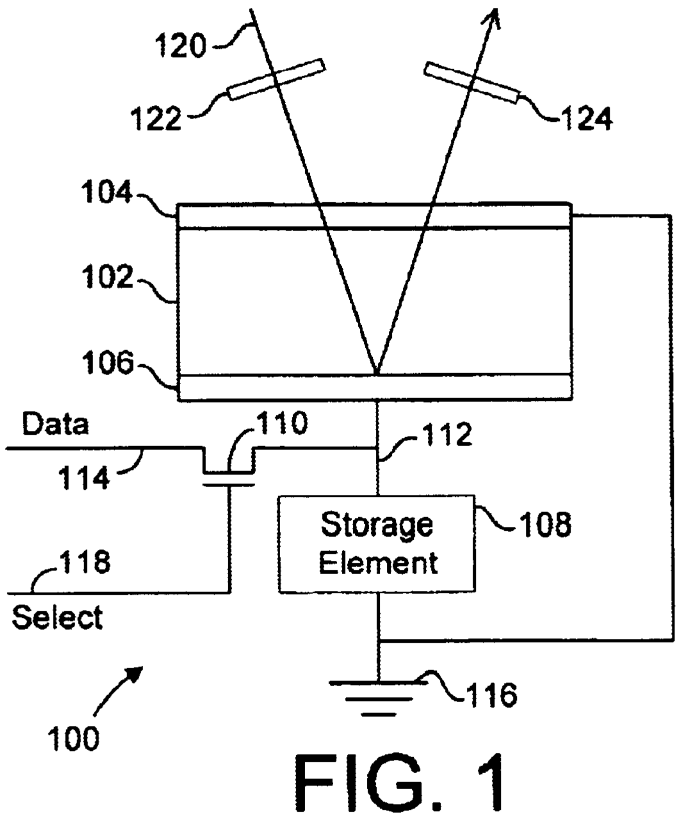
FIG. 1 Prior Art
FIG. 1 shows a single pixel cell of a typical liquid crystal display.
Figure 2:
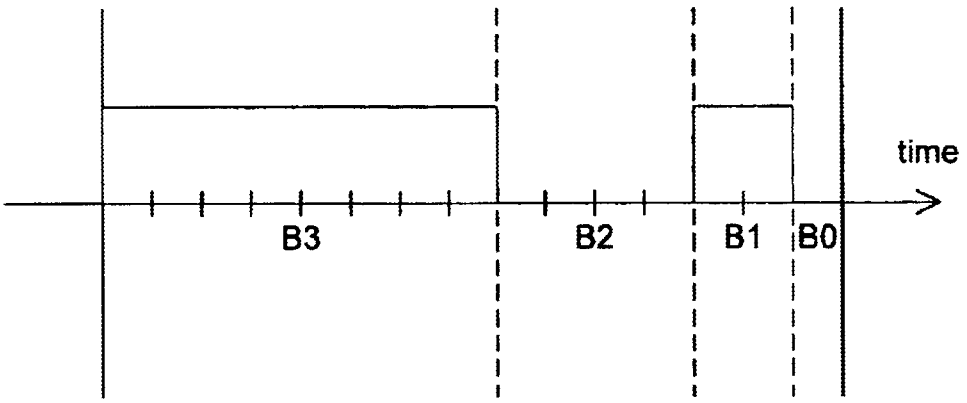
FIG. 2 Prior Art
FIG. 2 shows one frame of 4-bit pulse-width modulation data.
Figure 3:
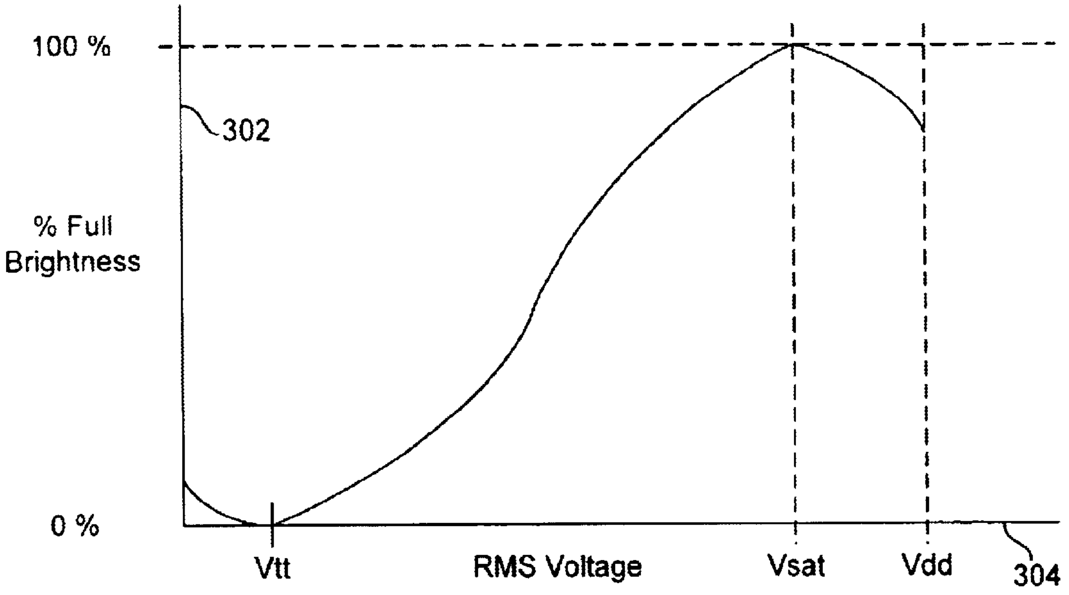
FIG. 3 Prior Art
FIG. 3 shows a steady-state brightness versus RMS voltage curve for a typical liquid crystal cell.
Figure 4:
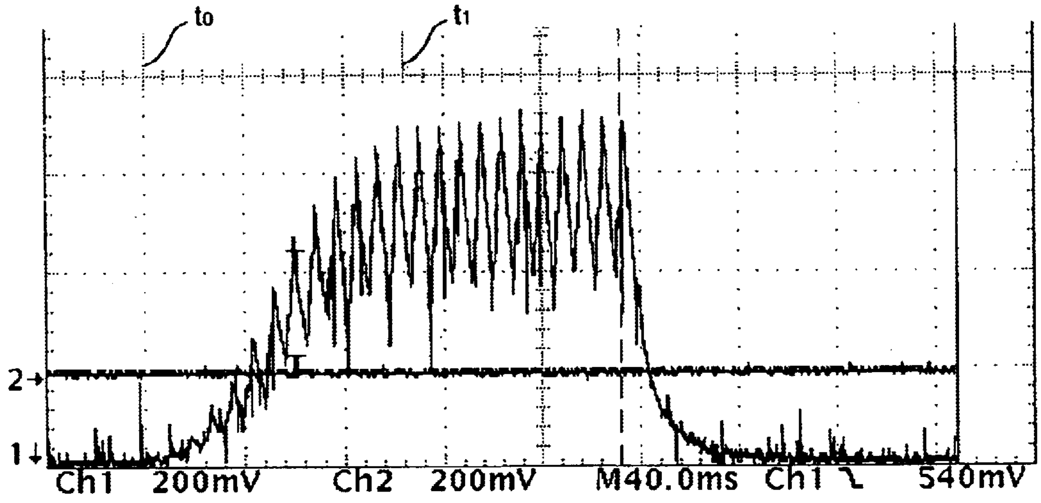
FIG. 4 shows an intensity response curve for a typical liquid crystal cell as a particular gray-value is repeatedly asserted on the cell.

After converting the received binary-weighted data words into planarized data words, driver circuit 800 transfers the planarized data words, via 32-bit data output bus 824, along with control signals, via LCD control bus 826, to micro-LCD 828, which includes an array (1024 rows×768 columns) of liquid crystal pixel cells, similar to the pixel cell shown in FIG. 1. Display driver circuit 800 is useful in many types of systems, including, but not limited to, computer displays and video projectors.

Input controller 804 uses the Hsync and Vsync signals to coordinate the transfer of data through rise time compensator 802, via compensated data bus 836 into data planarizer 808, and the transfer of planarized data from data planarizer 808 via 32-bit data bus 830 into frame buffers A 810 and B 812. Responsive to the Vsync and Hsync signals indicating valid data on data input bus 816, input controller 804 asserts signals on control lines DIR 832 and CLK 834, causing data to be clocked into and out of data planarizer 808. Specifically, input controller 804 clocks 32 8-bit words into data planarizer 808, and then clocks the data out as 8 32-bit words.

Input controller 804 also asserts signals on control bus 805 that identify the particular pixel associated with the data being received via data input bus 816. Frame (n−1) buffer 803 uses the control signals to store the incoming data in a location corresponding to the identified pixel, and to retrieve the previously stored data word associated with that same pixel. Then, frame (n-1) buffer 803 provides the data word from the previous frame (n−1) to rise time compensator 802 via (n−1) data bus 807.

Frame buffer A 810 and frame buffer B 812 are each 32-bit wide synchronous graphics random access memories (SGRAMs). Each of frame buffers 810 and 812 receives data, via 32-bit data bus 830, and stores the data in a memory location associated with a particular bit significance and a particular group of pixels of micro-LCD 828. Further, each of frame buffers 810 and 812 are of sufficient capacity to store 8 bits of gray scale data for each pixel in micro-LCD 828 (i.e., one frame worth of display data). For example, because micro-LCD 828 has 786,432 pixels (1024×768), frame buffers 808 and 810 each store 6,291,456 bits (one display screen worth) of data, or 196,608 32-bit words.

The transfer of data from data bus 830 into frame buffers 810 and 812 is also controlled by input controller 804 in cooperation with control selector 806. Input controller 804 asserts frame buffer control signals on input control bus 838 and a frame buffer select signal (SEL) on select line 840. Input control bus 838 includes a write enable line and address lines for indicating the memory location into which data is to be written. Each memory location corresponds to a particular bit of a compound data word intended for a particular group of pixel cells. For example, one particular 32-bit memory location contains the first equally-weighted data bit for each of pixels 0–31.

Control selector 806 includes a first multiplexer 842 and a second multiplexer 844. First multiplexer 842 has two sets of input terminals, the first set being coupled to the lines of input control bus 838. Second multiplexer 844 also has two sets of input terminals, the second set being coupled to the lines of input control bus 838. The output of first multiplexer 842 is asserted on frame buffer A control bus 846, and the output of second multiplexer 844 is asserted on frame buffer B control bus 848.

First multiplexer 842 and second multiplexer 844 are both controlled by the SEL signal being asserted on select line 840 by input controller 804. Responsive to a first (e.g. high) SEL signal being asserted on select line 840, first multiplexer 842 couples input control bus 838 with frame buffer A control bus 846, thus allowing input controller 804 to load data from data bus 830 into frame buffer A 810. The first SEL signal also causes second multiplexer 844 to decoupage input control bus 838 from frame buffer B control bus 848, so that no data is loaded into frame buffer B 812 while frame buffer A 810 is being loaded. Responsive to a second (e.g., low) SEL signal being asserted on select line 840, first multiplexer 842 decouples input control bus 838 from frame buffer A control bus 846 and couples input control bus 838 with frame buffer B control bus 848, thus allowing input controller 804 to load data from data bus 830 into frame buffer B 812. Input controller 804 toggles the SEL signal each time a Vsync signal is received, such that one display screen worth of data is written into each frame buffer 810 and 812 in alternating order.

Output controller 814 receives the Vsync signal via line 850, receives the dot clock input signal via line 852, controls the output of data from frame buffer A 810 and frame buffer B 812, and provides display control signals, via LCD control bus 826, to micro-LCD 828. Output controller 814 controls the output of data from frame buffer A 810 and frame buffer B 812 by asserting control signals on an output control bus 854, which is coupled to the second set of input terminals of first multiplexer 842 and to the first set of input terminals of second multiplexer 844. Thus, when the second SEL signal is asserted on select line 840 by input controller 804, first multiplexer 842 decouples input control bus 838 from and couples output control bus 854 to frame buffer A control bus 846, thus allowing output controller 814 to cause frame buffer A 810 to assert data onto data bus 824. On the other hand, when the first SEL signal is asserted on select line 840, second multiplexer 844 decouples input control bus 838 from and couples output control bus 854 to frame buffer B control bus 848, allowing output controller 814 to cause frame buffer B 812 to assert data onto data bus 824. Thus, while pixel data for one frame is being loaded into frame buffer A 810 by input controller 804, pixel data for the previous frame is being outputted from frame buffer B 812 by output controller 814, and vice versa.

Output controller 814 controls the amount of time that the bits of data words are asserted on the pixel electrodes as follows. First, output controller 814 asserts control signals on output control bus 854 causing frame buffer A 810 or frame buffer B 812 (depending on the current state of the SEL signal) to assert the contents of an indicated memory location on data bus 824. Then, output controller 814 asserts control signals on LCD control bus 826, causing micro-LCD 828 to load the bits asserted on data bus 824 onto the appropriate pixel cells. The loaded data remains on the pixel cells until output controller 814 writes the next bit to the pixel cells, a time controlled by output controller 814 to correspond to the significance of the previously loaded bit. Thus, each bit of data remains on the appropriate pixel electrode for a period of time dependent on the significance of the bit.

Figure 9:
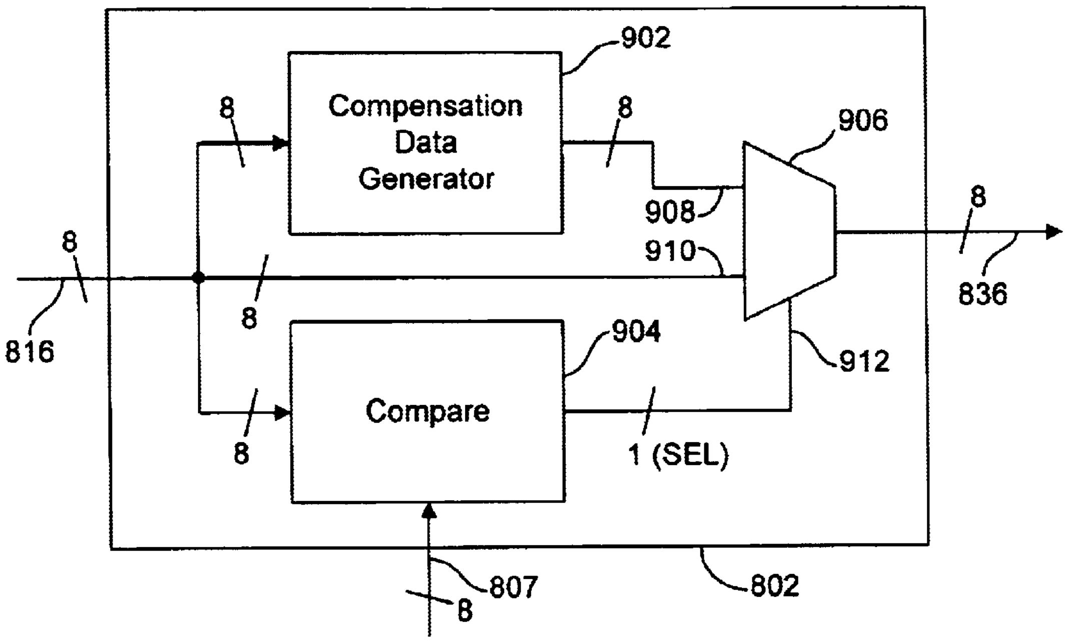
FIG. 9 is a block diagram of a rise-time compensation circuit shown in FIG. 7.

FIG. 9 is a block diagram showing rise time compensator 802 in greater detail. Rise time compensator 802 includes a compensation data generator 902, a compare circuit 904, and a multiplexer 906. Compensation data generator 902 receives the data words coming in on data input bus 816, and responsive to those data words asserts a corresponding compensated data word on a first input terminal set 908 of multiplexer 906. In this particular embodiment of the invention, compensation data generator 902 is a simple look-up table (LUT). A second input terminal set 910 of multiplexer 906 is coupled directly to data input bus 816.

Compare circuit 904 receives the incoming data word from data input bus 816, receives the corresponding data word from the previous frame from frame (n−1) buffer 803 (FIG. 8) via (n−1) data bus 807, compares the incoming data word with the data word from the previous frame, and asserts a select signal (SEL) on the control terminal 912 of multiplexer 906, depending on the results of the comparison. In this particular embodiment, compare circuit 904 simply determines whether the grayscale value of the incoming data word exceeds the grayscale value of the corresponding data word from the previous frame by some predetermined amount. If so, then compare circuit 904 asserts a first signal (e.g., digital high) on control terminal 912, causing multiplexer 906 to selectively couple input terminal set 908 with compensated data bus 836, thereby providing a compensated data word to data planarizer 808 (FIG. 8). If, however, the incoming data word does not exceed the previous data word by the predetermined amount, then compare circuit 904 asserts a second signal (e.g., digital low) on control terminal 912, causing multiplexer 906 to selectively couple second input terminal set 910 with compensated data bus 836, thereby passing the incoming data word directly through rise time compensator 802 unchanged.

Figure 10:
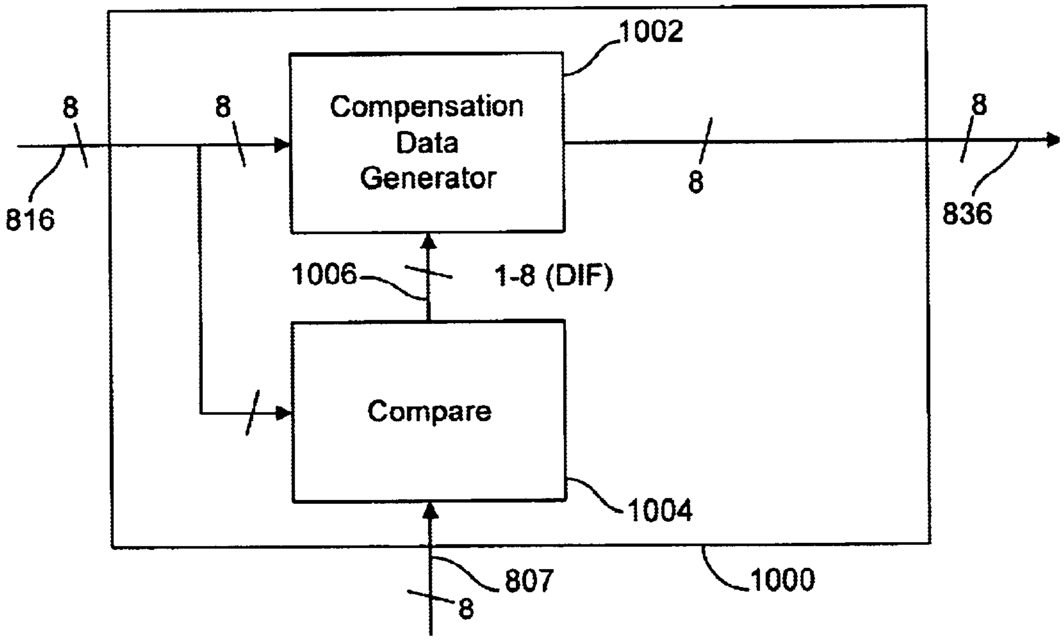
FIG. 10 is a block diagram of an alternate rise-time compensation circuit.

FIG. 10 shows an alternate rise time compensator 1000 capable of providing finer adjustment of the compensation data word values provided. In particular, for an incoming data word with a given value, rise time compensator 802 provides one of a plurality of different compensation data words depending on the difference in gray scale value between the incoming data word and the corresponding data word from the previous frame.

Alternate rise time compensator 1000 includes a compensation data generator 1002 and a compare circuit 1004. Compare circuit receives an incoming data word via input data bus 816, receives a corresponding data word from the previous frame of data via (n−1) data bus 807, compares the grayscale value of the incoming data word to the grayseale value of the previous data word, and asserts a difference (DIF) signal on DIF bus 1006 depending on the magnitude of the difference between the grayscale values.

DIF bus 1006 optionally includes 1–8 bits depending on the resolution of compensation data word values desired. For example, if DIF bus 1006 includes 2 bits, then 4 different compensation data words can be generated for each grayscale value. If DIF bus 1006 includes 3 bits, then 8 different compensation data words can be generated for each grayscale value.

Alternate compensation data generator 1002 uses the incoming data word on input data bus 816 and the DIF signal on DIF bus 1006 to retrieve an appropriate compensation data word, and then asserts the compensation data word on compensated data bus 836. If the value of the DIF signal asserted on DIF bus 1006 is 0, then compensation data generator 1002 simply passes the incoming data word through to data bus 836. Otherwise, compensation data generator uses the DIF signal and the incoming data word to retrieve a compensation data word from a LUT. Alternatively, compensation data generator can perform an appropriate mathematical operation on the DIF signal and the incoming data word (e.g., adding the DIF value to the value of the incoming data word) to generate the compensation data word.

Figure 11:
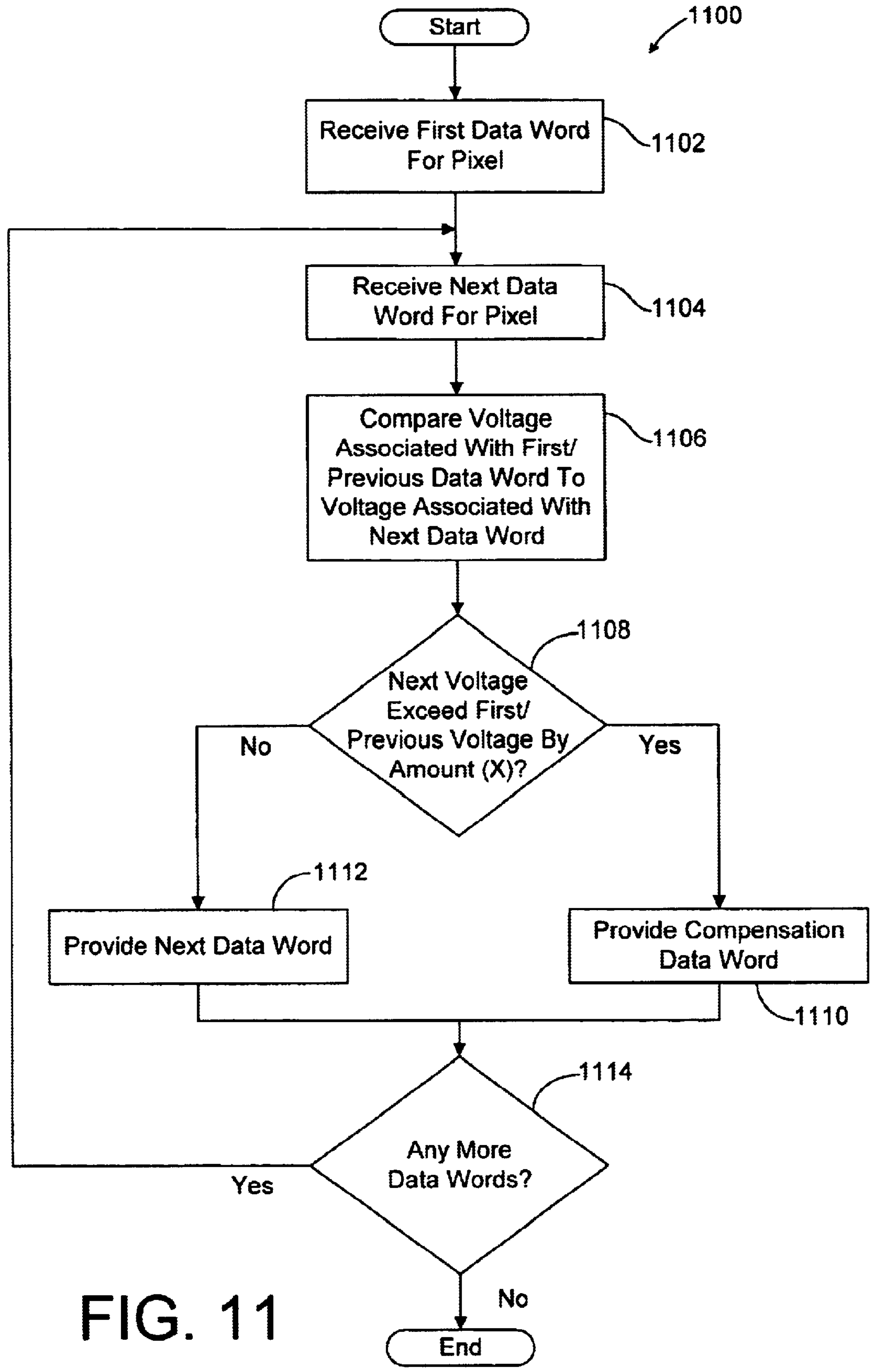
FIG. 11 is a flow chart summarizing one particular method of reducing the intensity output rise time in a liquid crystal display, according to the present invention.

FIG. 11 is a flow chart summarizing one particular method of compensating for the intensity output rise time in a liquid crystal display. In a first step 1102 frame (n−1) buffer 803 receives and stores a first data word intended for a particular pixel. Then, in a second step 1104, rise time compensator 802 receives a next (second) data word intended for the same pixel. Next, in a third step 1106, rise time compensator 802 compares the value of the first data word to the value of the second data word, and in a fourth step 1108 determines whether the value of the second data word exceeds the value of the first data word by a predetermined amount. If the value of the second data word exceeds the value of the first data word, then in a fifth step 1110, rise time compensator 802 outputs a compensation data word instead of the second data word. However, if in fourth step 1108, rise time compensator 802 determines that the value of the second data word does not exceed the value of the first data word by the predetermined amount, then method 1100 proceeds to a sixth step 1112 and outputs the second data word. Following either fifth step 1110 or sixth step 1112, method 1100 proceeds to a seventh step 1114 to determine whether there is any more incoming data. If so, method 1100 returns to second step 1104 and retrieves the next (third) data word intended for the particular pixel. Otherwise, method 1100 ends.

The description of particular embodiments of the present invention is now complete. Many of the described features may be substituted, altered or omitted without departing from the scope of the invention. For example, the invention may be employed to reduce the rise-time of liquid crystal cells in transmissive liquid crystal displays. Additionally, the invention may be used in a multi-color system by using a separate driver and display for each color, or by time multiplexing a single driver and display for more than one color. A separate rise-time compensation scheme can be employed for each different color, thus allowing each compensation scheme to be optimized for the particular color. Additionally, the invention may be employed with analog displays by applying a compensated voltage to a cell for a predetermined time period. Additionally, the invention may employed with a wide variety of pulse modulation schemes including, but not limited to, pulse-amplitude modulation, pulse-width modulation, pulse-position modulation, and pulse-code modulation.

I claim:

1. A display driver circuit comprising:

a buffer for receiving and storing a first data word, said first data word having a value corresponding to a first voltage to be asserted on a display pixel; and a rise-time compensator coupled to receive said first data word from said buffer and a second data word, said second data word having a value corresponding to a second voltage to be asserted on said display pixel, said rise-time compensator being operative to compare said first data word to said second data word, and to provide either said second data word or a compensation data word having a value corresponding to a voltage greater than said second voltage if said second voltage exceeds said first voltage by a predetermined amount.

2. A display driver circuit according to claim 1, wherein said rise-time compensator comprises:

a compensation data word generator for providing said compensation data word at an output;

a comparator having a first input coupled to receive said first data word from said buffer, a second input coupled to receive said second data word, and an output, said comparator being operative to generate a control signal indicating whether said second voltage exceeds said first voltage by said predetermined amount; and a multiplexer having a first data input coupled to receive said compensation data word, a second data input coupled to receive said second data word, a control terminal coupled to receive said control signal, and an output for providing one of said second data word or said compensation data word, depending on said control signal.

3. A display driver circuit according to claim 2, wherein said compensation data word generator is coupled to receive said second data word; and is operative to generate said compensation data word depending on said value of said second data word.

4. A display driver circuit according to claim 3, wherein said compensation data word generator comprises a look-up-table.

5. A display driver circuit according to claim 1, wherein said rise-time compensator comprises:

a comparator having a first input coupled to receive said first data word from said buffer, a second input coupled to receive said second data word, and an output for providing a difference signal indicative of the difference between said first data word and said second data word;

a compensation data word generator coupled to receive said second data word and said difference signal, for generating said compensation data word depending on said second data word and said difference signal.

6. A display driver circuit according to claim 5, wherein said compensation data generator comprises a look-up-table that uses said second data word and said difference signal to retrieve said compensation data word.

7. A display driver circuit according to claim 5, wherein said compensation data generator generates said compensation data word by adding said difference signal to said second data word.

8. A display driver circuit according to claim 1, wherein said value of said compensation data word depends on a display color associated with said second data word.

9. A display driver circuit according to claim 1, wherein said value of said compensation data word depends on the difference between said value of said first data word and said value of said second data word.

10. A display driver circuit according to claim 1, wherein said value of said compensation data word depends on said value of said second data word.

11. A display driver circuit according to claim 10, wherein said value of said compensation data word depends on the difference between said value of said first data word and said value of said second data word.

12. A method for writing data to a display comprising:

receiving a first data word having a value corresponding to a first voltage to be asserted on a pixel of said display;

receiving a second data word having a value corresponding to a second voltage to be asserted on said pixel of said display;

comparing said first data word to said second data word; and providing a compensation data word having a value corresponding to a voltage greater than said second voltage, if said second voltage exceeds said first voltage by a predetermined amount.

13. A method according to claim 12, wherein:

said step of comparing said first data word to said second data word comprises generating a selection signal indicating whether said second voltage exceeds said first voltage by a predetermined amount; and said step of providing said compensation data word comprises providing one of said compensation data word or said second data word depending on said selection signal.

14. A method according to claim 13, wherein said value of said compensation data word depends on said second data word.

15. A method according to claim 14, wherein said step of providing said compensation data word includes using said second data word to retrieve said compensation data word from a look-up-table.

16. An electronically readable medium having code embodied therein for causing an electronic device to perform the method of claim 15.

17. An electronically readable medium having code embodied therein for causing an electronic device to perform the method of claim 14.

18. An electronically readable medium having code embodied therein for causing an electronic device to perform the method of claim 13.

19. A method according to claim 12, wherein:

said step of comparing said first data word to said second data word comprises generating a difference signal indicative of the difference between said first data word and said second data word; and said step of providing said compensation data word comprises generating said compensation data word from said second data word and said difference signal.

20. A method according to claim 19, wherein said step of generating said compensation data word includes using said second data word and said difference signal to retrieve said compensation data word from a look-up-table.

21. An electronically readable medium having code embodied therein for causing an electronic device to perform the method of claim 20.

22. A method according to claim 19, wherein said step of generating said compensation data word includes using adding said second data word to said difference signal to obtain said compensation data word.

23. An electronically readable medium having code embodied therein for causing an electronic device to perform the method of claim 22.

24. An electronically readable medium having code embodied therein for causing an electronic device to perform the method of claim 19.

25. A method according to claim 12, wherein said value of said compensation data word depends on a display color associated with said second data word.

26. An electronically readable medium having code embodied therein for causing an electronic device to perform the method of claim 25.

27. A method according to claim 12, wherein said value of said compensation data word depends on the difference between said value of said first data word and said value of said second data word.

28. An electronically readable medium having code embodied therein for causing an electronic device to perform the method of claim 27.

29. A method according to claim 12, wherein said value of said compensation data word depends on the value of said second data word.

30. A method according to claim 29, wherein said value of said compensation data word depends on the difference between said value of said first data word and said value of said second data word.

31. An electronically readable medium having code embodied therein for causing an electronic device to perform the method of claim 30.

32. An electronically readable medium having code embodied therein for causing an electronic device to perform the method of claim 29.

33. An electronically readable medium having code embodied therein for causing an electronic device to perform the method of claim 12.

* * * * *